United States Patent
Haviv et al.

(10) Patent No.: US 10,536,521 B2
(45) Date of Patent: Jan. 14, 2020

(54) WEB SHARE

(71) Applicant: SAP PORTALS ISRAEL LTD., Ra'anana (IL)

(72) Inventors: Tal Haviv, Kiryat Ono (IL); Saar Dagan, Tel Aviv (IL); Lior Lavi, Tel Aviv (IL); Etay Angrest, Rishon Lezion (IL); Nadav Nuri, Zoran (IL)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 15/647,451

(22) Filed: Jul. 12, 2017

(65) Prior Publication Data

US 2019/0020715 A1   Jan. 17, 2019

(51) Int. Cl.
| | |
|---|---|
| G06F 15/16 | (2006.01) |
| H04L 29/08 | (2006.01) |
| G06F 16/95 | (2019.01) |
| G06F 16/958 | (2019.01) |

(52) U.S. Cl.
CPC .......... H04L 67/1095 (2013.01); G06F 16/95 (2019.01); G06F 16/972 (2019.01); H04L 67/30 (2013.01); H04L 67/34 (2013.01); H04L 67/02 (2013.01); H04L 67/10 (2013.01); H04L 67/26 (2013.01); H04L 69/329 (2013.01)

(58) Field of Classification Search
CPC ......... H04L 67/10; H04L 67/02; H04L 67/26; G06F 16/95
USPC ................................. 709/203–207, 227–228
See application file for complete search history.

(56) References Cited

U.S. PATENT DOCUMENTS

| | | | | |
|---|---|---|---|---|
| 8,514,842 | B1 * | 8/2013 | Jared | H04L 12/1822 370/352 |
| 8,650,494 | B1 * | 2/2014 | Sampath | H04L 67/02 715/740 |
| 8,700,699 | B2 * | 4/2014 | Shen | H04L 67/02 709/203 |
| 9,836,385 | B2 * | 12/2017 | Malla | G06F 11/3664 |
| 9,992,258 | B2 * | 6/2018 | Koum | H04L 67/2823 |
| 2009/0106366 | A1 * | 4/2009 | Virtanen | H04L 51/36 709/206 |
| 2012/0151308 | A1 * | 6/2012 | Falkenberg | G06F 16/957 715/201 |
| 2015/0293889 | A1 * | 10/2015 | Hatch | G06F 16/957 715/234 |
| 2016/0259630 | A1 * | 9/2016 | Roos | G06F 16/951 |

* cited by examiner

*Primary Examiner* — Bharat Barot
(74) *Attorney, Agent, or Firm* — Buckley, Maschoff & Talwalkar LLC

(57) ABSTRACT

A method and system are provided including a web share module; a display; a memory storing processor-executable process steps; and a web share processor coupled to the memory, and in communication with the web share module and operative to execute the processor-executable process steps to cause the system to: connect at least two devices, each device having a web browser; receive a selection of a web element from the web browser of a first device of the at least two devices; transfer, via a communication channel, the selected web element to the web browser of a second device of the at least two devices; and launch the web element on the second device. Numerous other aspects are provided.

27 Claims, 5 Drawing Sheets

WEB SHARE

BACKGROUND

Users typically install and operate one or more web applications on a desktop computing device or an internet of things (IOT) device (e.g., connected or "smart" devices). A first user may wish to install and operate a web application which is being operated by a second user. In order to do so, the first user must identify a source of the web application (e.g., a library), download the web application from that source, and then launch the web application. Alternatively, the second user sends a request, via her device, to continually poll another service for the web application. These processes to acquire the web application are costly, at least in terms of time and resources.

Systems and methods are desired which support efficient sharing of web applications.

DETAILED DESCRIPTION

Figure 1:
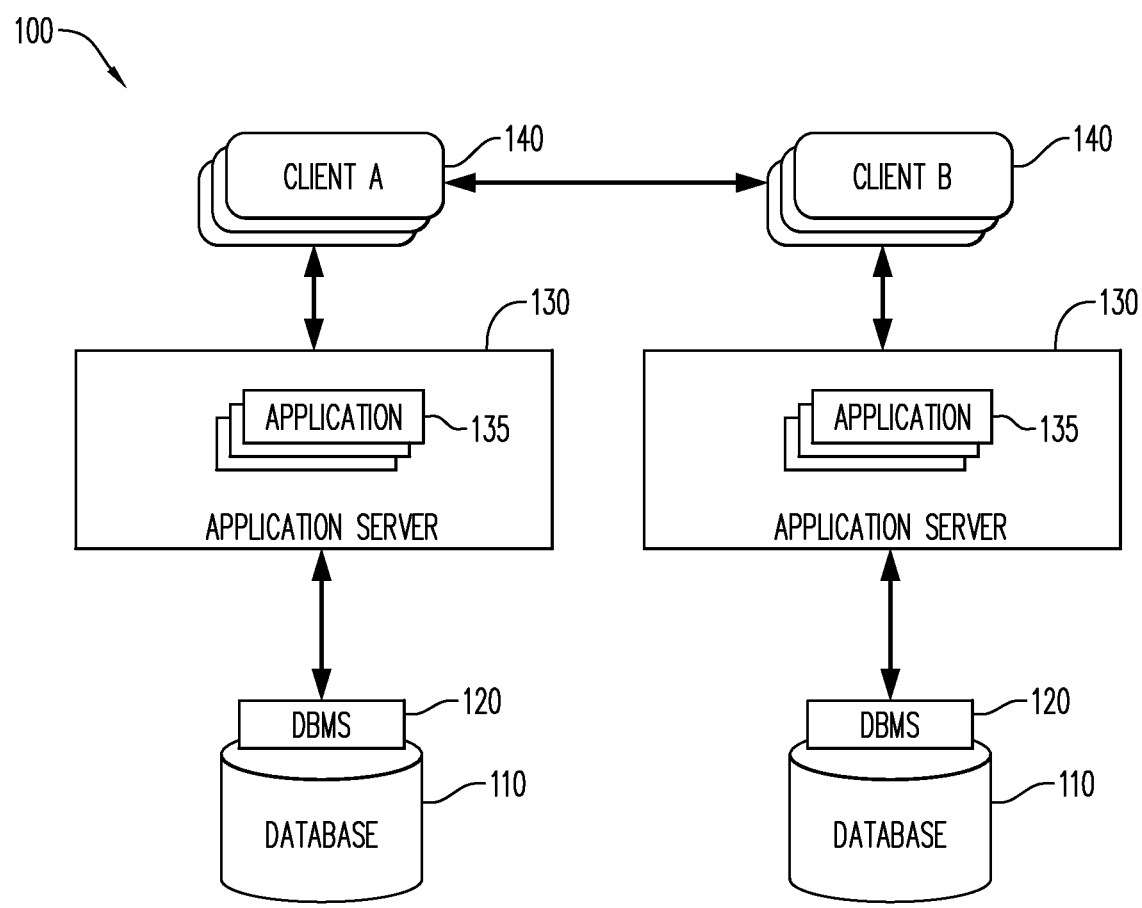
FIG. 1 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Conventionally, web elements may be shared between users, but User A cannot simply send a web application to User B's device. For example, a new employee may need to setup his new computing environment. A veteran employee cannot easily share his web applications with the new employee. Instead the new employee may have to access a web application library, as described above. As another example, an application developer may meet a prospective customer to demonstrate part of a web application (e.g., Fiori Launchpad application). At the meeting, the prospective customer may want to demo the application on his own device. In this instance, the prospective customer may have to register with a service with which the web developer is also registered, and the prospective customer may then send a request that continually polls the service to determine if the web application is available for the prospective customer to download; or the customer needs to ask his administrator to install the application and make it available.

Some embodiments may provide a framework (e.g., Web Share module) that supports transferring web elements between two or more web browsers. In some embodiments, the two or more web browsers may be associated with two or more devices, where each device is associated with a web browser. Some embodiments may also support the transfer of web elements between two or more web browsers when the two or more web browsers are associated with a single device.

As used herein, the term "web element" may refer to anything that may be viewed in a web browser, and may include both the viewable representation on the web browser as well as the underlying web application associated with that viewable representation. Web elements may be Document Object Model (DOM) elements like DIVs, paragraphs, etc. In one or more embodiments, it may be possible to transfer other web elements (e.g., Java-Scripts and CSS, which forms the underlying web applications).

As used herein, a "web application" is an application program that is stored on a remote server and delivered over the Internet through a web browser interface. As used herein, a web browser is a software application for retrieving, presenting and traversing information resources provided by web servers (e.g., the World Wide Web or private networks or file systems). As used herein, a "computing device" may refer to any electronic equipment controlled by a central processing unit, including desktop and laptop computers, smart phones, tablets and any IoT device.

Some embodiments provide for the process to begin with the electronic connection of at least two devices. Then a first user may select a web element to transfer to a second user. The web element may be selected from a user interface provided by a web browser running on a first computing device. After selection of the web element, the selected web element may be retrieved by a Web Share module and then transferred to a second computing device of the second user. For example, the first user may click on the web element on their user interface (e.g., a tile representing a web application) and then drag and drop the tile onto the user interface of the second computing device. The user interface web element (e.g., tile) and the application executed via activation of the user interface web element are transferred to the second computing device via the Web Share module. Then, the second user may launch the web element on the second computing device by clicking on the tile or the web element may automatically launch after being dropped onto the user interface of the second computing device. The inventors note that a benefit of one or more embodiments is that the sharing of a web element may be faster and easier to process, and may require less resources than conventional processes of sharing a web element Benefits of one or more embodiments include: the ability to allow users to share web elements without the need of any external infrastructure; the transfer of not just data or metadata, but also the application itself, to be executed at runtime; an increase in data privacy for a user (e.g., no need for another program (e.g., email/Whatsapp) to transfer the elements, that may provide another opportunity to further expose the data); the ability to transfer web elements across platforms and devices; and a simple intuitive user experience without the need of third party involvement.

FIG. 1 is a block diagram of system architecture 100 according to some embodiments. Embodiments are not limited to architecture 100 or to a three-tier database architecture. Each client (e.g., Client A and Client B) may include the same and/or similar architecture, and as will be further described below, may communicate with each other to transfer web elements between them.

Architecture 100 includes database 110, database management system (DBMS) 120, application server 130, applications 135 and clients 140. Applications 135 may comprise server-side executable program code (e.g., compiled code, scripts, etc.) executing within application server 130 to receive queries from clients 140 and provide results to clients 140 based on data of database 110. One such application 135 may comprise a website application.

Application server 130 provides any suitable interfaces through which clients 140 may communicate with applications 135 executing on application server 130. For example, application server 130 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by applications 135. Continuing with the web application example, database 110 may include information (e.g., Purchase Order records), and/or any other data for providing in a web application.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each client 140 may comprise one or more individuals or devices executing program code of a software application for presenting user interfaces to allow interaction with application server 130 and between each other. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or Web Socket, and may render and present the Web page according to known protocols. One or more of clients 140 may also or alternatively present user interfaces by executing a standalone executable file (e.g., an .exe file) or code (e.g., a JAVA applet) within a virtual machine. A first user may then select one or more elements from the Web page or user interface at a first user device to transfer to a second user at a second user device.

As used herein, devices, including those associated with the system 100 and any other devices described herein, may exchange information via any communication network which may be one or more of, a Near Field Communication ("NFC") network; a Web Real-Time Communication (RTC) network; a Bluetooth network; and/or an Internet Protocol ("IP") network such as the Internet, an intranet, or an extranet. Note that any devices described herein may communicate via one or more such communication networks.

FIGS. 2-5 include an architecture (FIG. 2) and flow diagram of a process 300 (FIG. 3) according to some embodiments. Process 300 may be executed by application server(s) 130 according to some embodiments, to provide a user with access to the user interface 400 (FIGS. 4A/4B). In one or more embodiments, the application server(s) 130 may be conditioned to perform the process 300, such that a processor 510 (FIG. 5) of the server 130 is a special-purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. Examples of these processes will be described below with respect to embodiments of the system, but embodiments are not limited thereto. The flow chart(s) described herein do not imply a fixed order to the steps and embodiments of the present invention may be practiced in any order that is practicable.

User interface 406, 410 may be presented on any type of display apparatus (e.g., desktop monitor, smartphone display, tablet display) provided by any type of client device (e.g., desktop system, smartphone, tablet computer). The application which is executed to provide user interface 400 may comprise a Web Browser, a standalone application, or any other application. Embodiments are not limited to user interface 406, 410 of FIG. 4.

As used herein, the term "smart device" refers to any device (e.g., cellular phone, tablet, watch, ring, etc.) that is able to perform many of the functions of a computer, typically having a relatively large screen and an operating system capable of running general- and specific-purpose applications. As used herein, the term "tablet" refers to a general-purpose computer contained in a single panel, typically using a touch screen as the input device capable of running general- and specific-purpose applications. However, other input devices (e.g., keyboard, mouse, etc.) may be coupled to the tablet for use as input devices. Tablets and smart devices may typically come loaded with a web browser and a variety of applications ("apps"). As used here, the term "app" refers to a self-contained program or piece of software designed to fulfill a particular purpose.

Figure 4A:
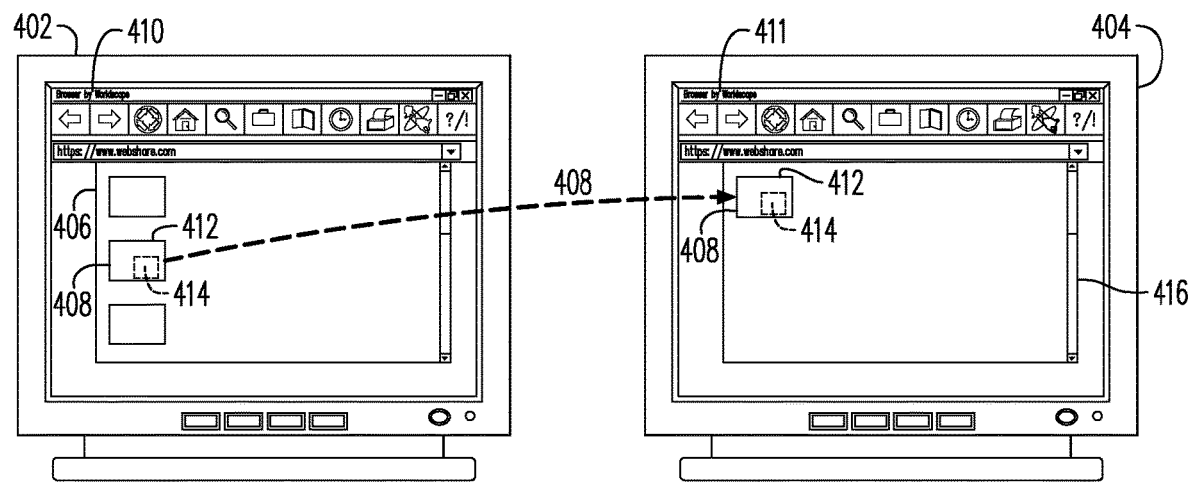
FIG. 4A is an outward view of a graphical interface according to some embodiments.
Figure 4B:
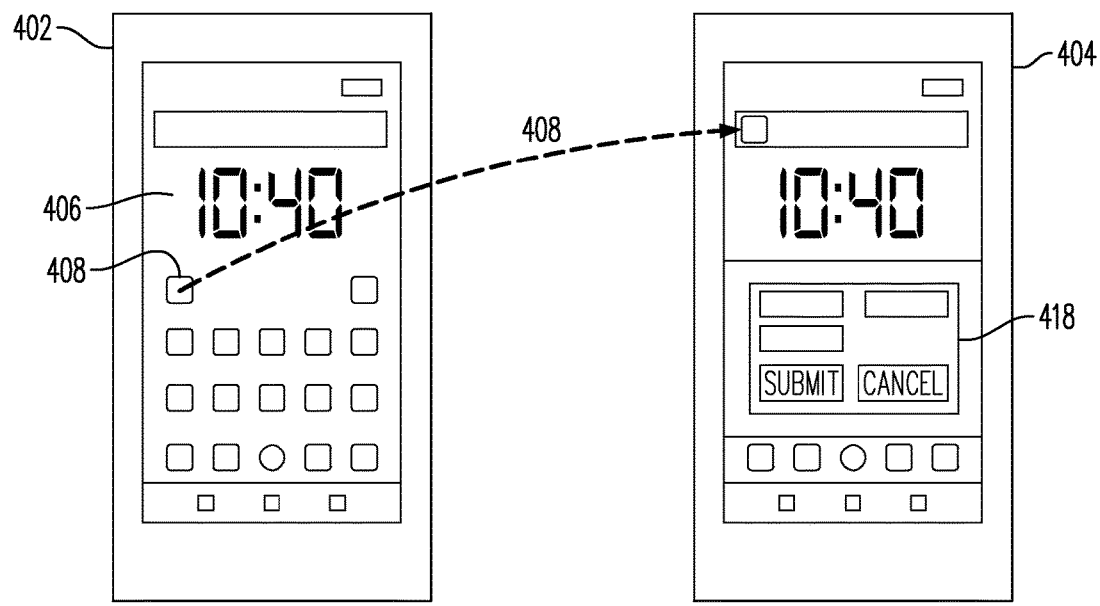
FIG. 4B is an outward view of a graphical interface according to some embodiments.

Process 300 will be described with respect to FIGS. 2 and 4A and 4B.

Initially at S310, a user interface 406 (FIG. 4) provided by a web browser 410 is displayed on a first user device 402 to a first user 201. The user interface 406 may be associated with a web application and may include one or more web elements 408. In one or more embodiments, each web element 408 may be represented on the user interface 406 as a graphical element 412 (e.g., tile, Group of Tiles, Table, other suitable graphical elements). As described above, the web element 408 may include both the viewable graphical element 412 on the user interface as provided by the web browser as well as an underlying business logic/web application 414 associated with that viewable graphical element 412. The underlying Web-Application may include Javascripts, Cascading Style Sheets (CSS), XML, and any other suitable programming language. In one or more embodiments, the business logic/web application 414 may be at least one of HTML, JavaScript, and elements that JavaScript can support (e.g., JSON). Any other suitable computing language may be used for the business logic/web application 414.

Then in S312, the first user 201 decides they would like to send a web element 408 from their first user device 402 (FIG. 4) to the second user 203 (FIG. 2) on the second user's device 404. The inventors note, however, this may be a non-exhaustive example, and a first user may decide to send the web element from their first user device to their second user device, or from a first browser on their first user device to a second browser on their first user device. Each of the first user device 402 and the second user device 404 may be a computing device, as described above. In one or more embodiments, each of the first user device 402 and the second user device 404 may have a browser loaded on the device. In one or more embodiments, the browser may support at least one of Web RTC, Web Bluetooth, and NFC communication protocols. The inventors note that while FIGS. 4A and 4B show the first user device 402 and the second user device 404 as the same type of device, this is a non-exhaustive example, and the first user device 402 and the second user device 404 may be different device types. For example, the first user device 402 may be a desktop computer and the second user device 404 may be a smartphone.

In one or more embodiments, steps S310 and S312 may be reversed, and the first user may decide to send a web element before displaying the web element on their first user device. For example, the veteran employee decides to share his web elements with all new employees before even meeting the new employee.

Figure 2:
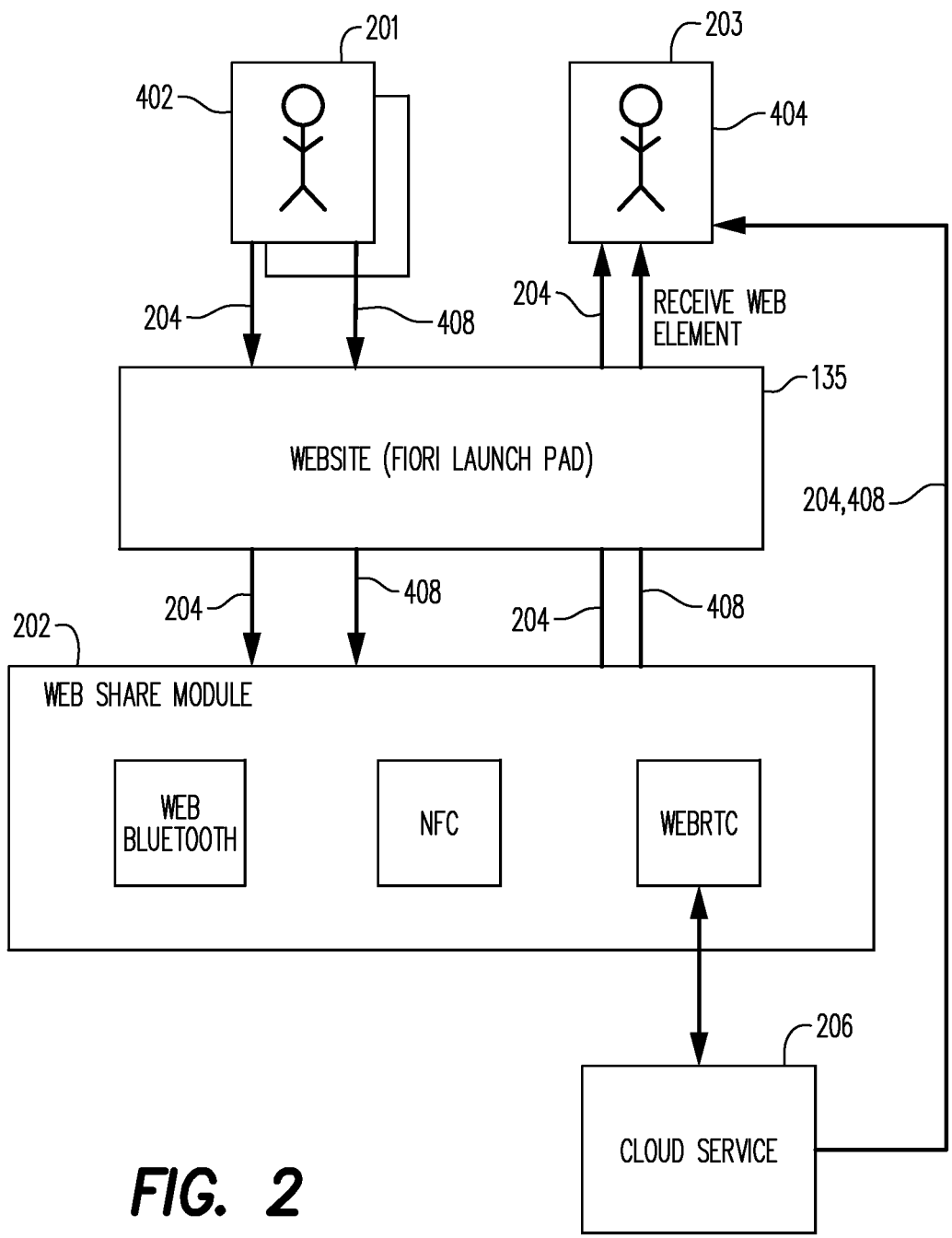
FIG. 2 is block diagram of a system architecture according to some embodiments.
Figure 3:
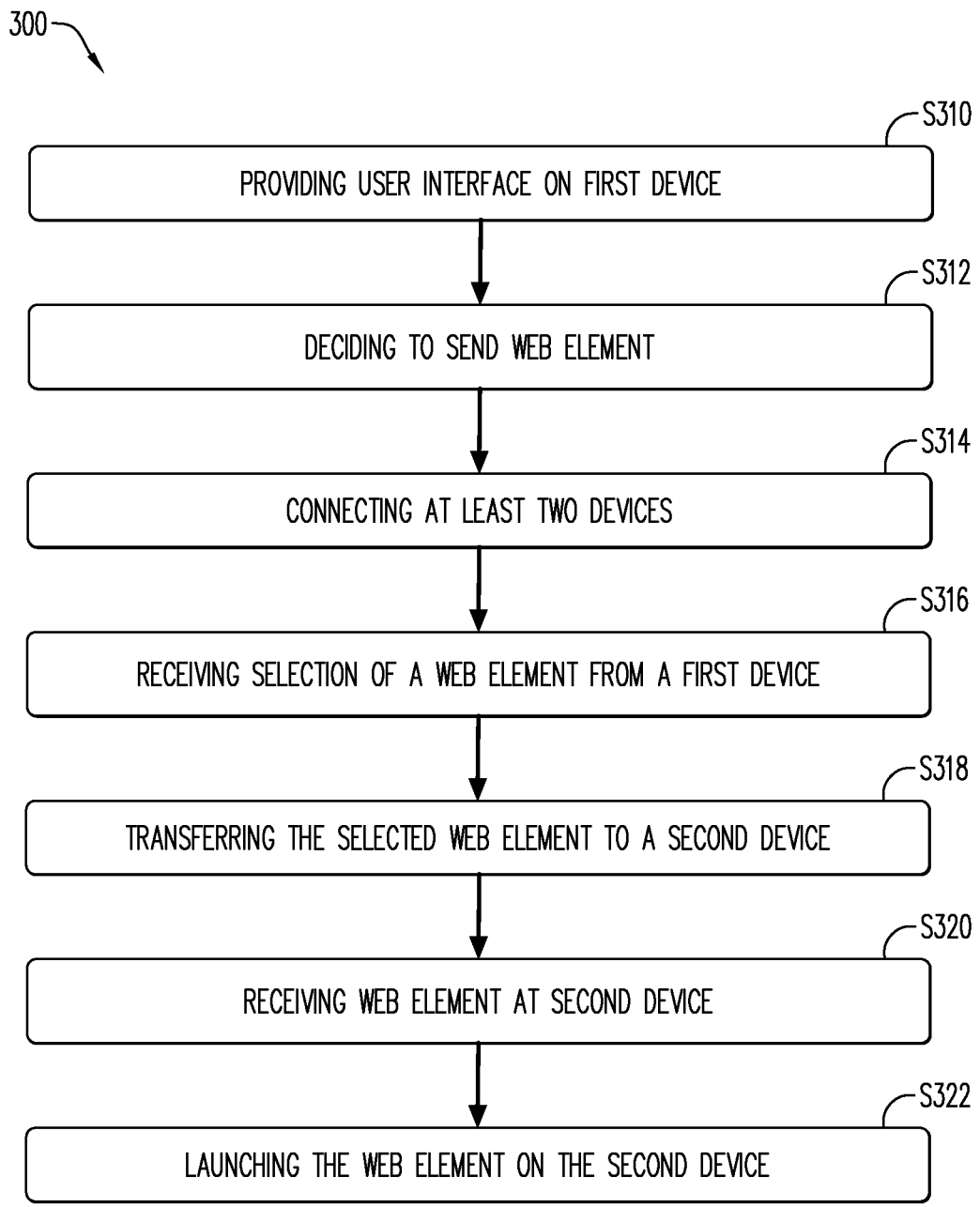
FIG. 3 is a flow diagram of a process according to some embodiments.

Then in S314, the at least two devices 402, 404 are connected via a Web Share module 202 (FIG. 2). In one or more embodiments, the connection may be via a handshake executed between the at least two devices 402, 404. As used herein, a "handshake" may refer to an exchange of predetermined signals between devices, made at least one of: when a connection is initially established or at intervals during data transmission, in order to assure proper synchronization between devices. In one or more embodiments the handshake may at least one of: verify the connection between the two devices, the speed or the authorization of a first device trying to connect to a second device. In one or more embodiments, the first user device 402 may locate the second user device 404. The manner in which the first device locates the second device may be dependent on the technology used. For example, Bluetooth and NFC technology locate nearby devices using the technology provided by Bluetooth and NFC. As another example, with Web RTC, browsers associated with each device may be connected via a web socket to a same server with a same identifier representing the session (e.g., the browser may be launched with an identifier as a url parameter). After locating the device, the first user device 402 may send an approval request 204 to the second user device 404 for the connection, as part of the handshake. In the instance where the application appears in the sender's browser, an approval request may be sent.

In one or more embodiments, the approval request 204 may be routed directly from the first user device 402 ("sender device") to the second user device 404 ("receiver device"), as when using Web Bluetooth or NFC, via the Web share module 202. In one or more embodiments, the approval request 204 may be indirectly routed from the first user device 402 to the second user device 404. For example, each of the devices may be registered with a cloud service (e.g., Web RTC server) 206 that may act as an intermediate proxy between the two devices. In the instance of the indirect routing, the approval request 204 may be sent to the cloud service 206 by the Web share module 202, and then the cloud service 206 may send the approval request 204 to the second user device 404. In one or more embodiments, the connection/handshake and sending web elements 408 between devices may be via any suitable air data transmission protocol that enables sending data over the air (e.g., Web RTC servers, Web Bluetooth and NFC protocols.)

Then the second user device 404 determines whether to accept the approval request 204, based on conventional handshake practices. If the second user device 404 denies the approval request 204, the first user device 402 and the second user device 404 are not connected, and web elements 408 may not be transferred between them. If the second user device 404 accepts the approval request 204, a connection is established between the first user device 402 and the second user device 404 and web elements 408 may be sent between the devices 402, 404.

Then in S316 the first user 201 selects one of the one or more web elements 408 to send, and the selection is received at the Web share Module 202. In one or more embodiments, the first user 201 may select the web element 408 by clicking on the graphical element 412. In one or more embodiments, the first user 201 may select the web element 408 may using a customized wizard for object selection. Other suitable selection processes may be used. The Web Share module 202 may then transfer the selected web element 408 to the second user device 404 over the air in S318. In one or more embodiments, the transfer of the web element 408 may be via a "push" process.

As used herein a push process is a transfer of web elements 408 that is initiated by the producer or sender device 402. The inventors note that the benefit of using the push process, as opposed to a "pull" process (transfer of web elements that is initiated by the receiver device 404), is with the push process the interaction is started by the sender device and the receiver device only needs to passively wait for the web elements, while with the pull process, the receiver device uses resources to actively query/poll the sender device to determine if there are web elements 408 available for transfer. The inventors note that other benefits of the push process include the removal of the load from the browser, as there is not a need to constantly check for updates; and a faster response time (e.g., immediate rather than interval based.)

In one or more embodiments, when the selection is received at the Web Share module 202, the Web Share module 202 may retrieve the web element 408 from, e.g., the browser 410 associated with the first user device 402 with Bluetooth and NFC, and the cloud storage with Web RTC, and send it to a browser 411 (or cloud storage) associated with the second user device 404 via an air data transmission protocol (e.g., Web RTC servers, Web Bluetooth and NFC). In one or more embodiments, the second user device 404 may accept the connection to the first user device 402 before the web element 408 is transmitted.

The inventors note that in one or more embodiments, the web element 408 may be sent to browsers associated with one or more second user devices. For example, one or more second user devices may be associated with a Web RTC server 206. The one or more second user devices 404 may be registered with the Web RTC server to receive data from a particular first user device 402. The Web RTC server may determine that it has received a web element 408 from the first user device 402, and then may have the Web Share module 202 distribute the web element 408 to all of the second user devices, or less than all of the second user devices. In one or more embodiments, at least one namespace may be created, including less than all of the second user devices. The namespace may be created by the sender or an administrator, in one or more embodiments. Then the Web Share module 202 may send the web element 408 to that second user device included in that namespace instead of all of the second user devices 404. In one or more embodiments, when the web element 408 is sent to two or more second user devices 404, the transmission may be one of simultaneously or at different times.

As another example, when the air data transmission protocol is Web Bluetooth, the first and second user devices may include the appropriate Bluetooth hardware and software. Prior to transmission, the Bluetooth may be enabled in the first user device 402. In one or more embodiments, the enablement may be before or after the web element 408 is selected. Then the first user 201 may determine which second user device 404 is available to receive the selected web element 408, and may then select the second user device 404 to receive the selected web element 408. The user may execute the transmission of the web element 408 by dragging and dropping the web element 408 from the first user device 402 to a graphical representation of the second user device displayed on the first user device (e.g. a tile, an address, etc.), via a "send" button or other suitable way. After dropping the web element 408 onto the representation of the second device, or otherwise initiating transmission of the web element 408 to the second user device 404, the Web Share module 202 may retrieve the web element 408 from the browser 410 associated with the first user device 402 and send it to the browser 411 associated with the second user device 404. In one or more embodiments, the first user device 402 may be able to send the web element 408 to more than one second user device 404 simultaneously.

As another example, when the air data transmission protocol is NFC, the first and second user devices may include the appropriate NFC hardware and software. Prior to transmission, the NFC may be enabled in both the first and second user devices 402, 404. In one or more embodiments, the enablement may be before or after the web element 408 is selected. When the first and second user devices 402, 404 are in the appropriate proximity to each other for NFC, the user may execute the transmission of the web element 408 via a drag and drop action or selection of a "send" button or other suitable selector, as described above. After dropping the web element or otherwise initiating the transmission, the Web Share module 202 may retrieve the web element 408 from the browser 410 associated with the first user device 402 and send it to the browser 411 associated with the second user device 404. In one or more embodiments, the data element 408 may be sent to more than one second user device sequentially.

Then in S320, the web element 408 is received at the second user device 404, and the graphical element 412 is displayed on a user interface 416 provided by web browser 411 associated with the second user device 404. In one or more embodiments, the user 203 of the second user device 404 may accept or reject the transmitted web element 408 in a separate action prior to the display of the graphical element 412 on the user interface 416. In one or more embodiments, the browser 411 associated with the second user device 404 may be one of the same browser as or a different browser than the web browser 410 associated with the first user device 402. Then in S322, the web element 408 is launched on the second user device 404. In one or more embodiments, when the web element 408 is received at the second user device 404, the business logic/web application 414 may be automatically started/launched. In one or more embodiments, the second user 203 may select the graphical element 412 displayed on their user interface 416 to start the business logic/web application 414. In one or more embodiments, when the business logic/web application 414 starts, it may be executed as a demonstration running with mock data or it may be executed as a real application running with real data 418 as run in the first user device 402 (as shown in FIG. 4B).

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 5:
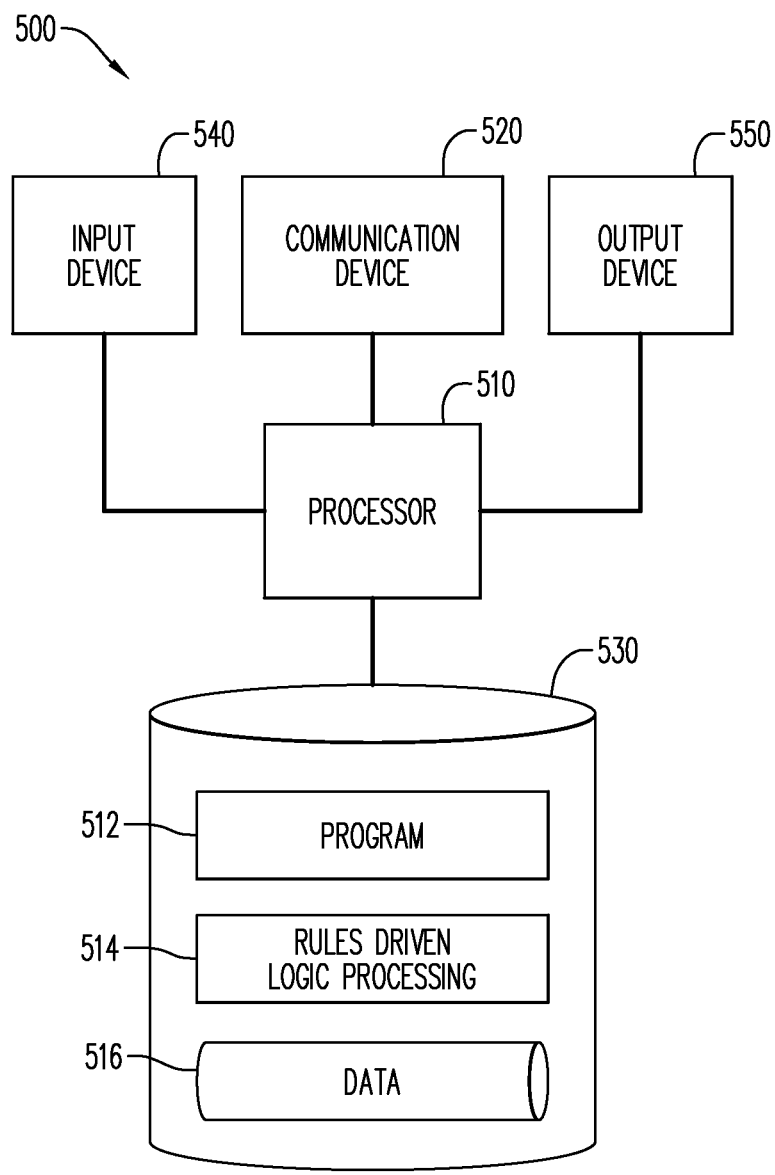
FIG. 5 is a block diagram of a system according to some embodiments.

FIG. 5 is a block diagram of apparatus 500 according to some embodiments. Apparatus 500 may comprise a general- or special-purpose computing apparatus and may execute program code to perform any of the functions described herein. Apparatus 500 may comprise an implementation of one or more elements of system 100. Apparatus 500 may include other unshown elements according to some embodiments.

Apparatus 500 includes Web Share processor 510 operatively coupled to communication device 520, data storage device 530, one or more input devices 540, one or more output devices 550 and memory 560. Communication device 520 may facilitate communication with external devices, such as application server 130. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to manipulate graphical user interfaces and to input information into apparatus 500. Output device(s) 550 may comprise, for example, a display (e.g., a display screen) a speaker, and/or a printer.

Data storage device/memory 530 may comprise any device, including combinations of magnetic storage devices (e.g., magnetic tape, hard disk drives and flash memory), optical storage devices, Read Only Memory (ROM) devices, Random Access Memory (RAM) etc.

The storage device 530 stores a program 512 and/or web share platform logic 514 for controlling the processor 510. The processor 510 performs instructions of the programs 512, 514, and thereby operates in accordance with any of the embodiments described herein, including but not limited to process 300.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a web share module;
a display;
a memory storing processor-executable process steps; and
a web share processor coupled to the memory, and in communication with the web share module and operative to execute the processor-executable process steps to cause the system to:
connect at least two devices, each device having a web browser;
receive a selection of a web element from the web browser of a first device of the at least two devices;
transfer, via a communication channel, the selected web element from the first device to the web browser of a second device of the at least two devices; and
launch the web element on the second device.

2. The system of claim 1, wherein of the at least two devices, the first device is a sender device and the second device is a receiver device.

3. The system of claim 2, wherein the at least two devices connect via a handshake.

4. The system of claim 3, wherein the handshake further comprises processor-executable process steps to cause the system to:
receive, from the sender device, an approval request for the receiver device; and
receive, from the receiver device, a response to the approval request.

5. The system of claim 1, wherein the communication channel is one of Web Real Time Communication (RTC), Web Bluetooth and Near Field Communication (NFC).

6. The system of claim 1, wherein the web element is a user interface and an application supporting the user interface.

7. The system of claim 6, wherein the application is written in one of HTML, Java Script Object Notation (JSON), JavaScript, and JavaScript Object.

8. The system of claim 6, wherein in response to the transfer of the web element, the user interface of the transferred web element is displayed on a display of the second device.

9. The system of claim 1, wherein the launch of the web element on the second device is automatic in response to receipt of the web element.

10. The system of claim 1, wherein the transfer of the selected web element to the second device is a push process.

11. The system of claim 1, wherein the selected web element is transferred one of directly and indirectly from the web browser of the first device to the web browser of the second device.

12. A computer-implemented method comprising:
执行 executing a handshake between at least two devices, each device having a web browser;
receiving, at a web share module, a selection of a web element from the web browser of a sender device of the at least two devices;
transferring, by the web share module via a communication channel, the selected web element from the sender device to the web browser of a receiver device of the at least two devices; and
launching the web element on the receiver device.

13. The method of claim 12, wherein executing the handshake further comprises:
receiving, from the sender device, an approval request for the receiver device;
approving or denying the approval request at the receiver device; and
receiving, from the receiver device, a response to the approval request, wherein the response one of accepts or denies the approval request.

14. The method of claim 12, wherein the communication channel is one of Web Real Time Communication (RTC), Web Bluetooth and Near Field Communication (NFC).

15. The method of claim 12, wherein the web element is a user interface and an application supporting the user interface.

16. The method of claim 15, wherein the application is written in one of HTML, Java Script Object Notation (JSON), JavaScript, and JavaScript Object.

17. The method of claim 15, further comprising:
displaying the user interface of the transferred web element on the display of the receiver device in response to the transfer of the web element.

18. The method of claim 12, wherein the launch of the web element on the second device is automatic in response to receipt of the web element.

19. The method of claim 12, wherein the transfer of the selected web element to the second device is a push process.

20. A non-transitory computer-readable medium storing program code, the program code executable by a computer system to cause the computer system to:
connect at least two devices, each device having a web browser;
receive, at a web share module, a selection of a web element from the web browser of a sender device of the at least two devices;
transfer, by the web share module via a communication channel, the selected web element from the sender device to the web browser of a receiver device of the at least two devices; and
launch the web element on the receiver device.

21. The medium of claim 20, wherein prior to the connection, program code executable by the computer system causes the computer system to:
receive, from the sender device, an approval request for the receiver device; and
receive, from the receiver device, a response to the approval request.

22. The medium of claim 20, wherein the communication channel is one of Web Real Time Communication (RTC), Web Bluetooth and Near Field Communication (NFC).

23. The medium of claim 20, wherein the web element is a user interface and an application supporting the user interface.

24. The medium of claim 23, wherein the application is written in one of HTML, Java Script Object Notation (JSON), JavaScript, and JavaScript Object.

25. The medium of claim 23, wherein in response to the transfer of the web element, the user interface of the transferred web element is displayed on the display of the second device.

26. The medium of claim 20, wherein the launch of the web element on the second device is automatic in response to receipt of the web element.

27. The medium of claim 20, wherein the transfer of the selected web element to the second device is a push process.

* * * * *